July 25, 1933.  M. TRESCHOW  1,919,489
TUBE MILL BEARING DEVICE
Filed May 2, 1931     2 Sheets-Sheet 1
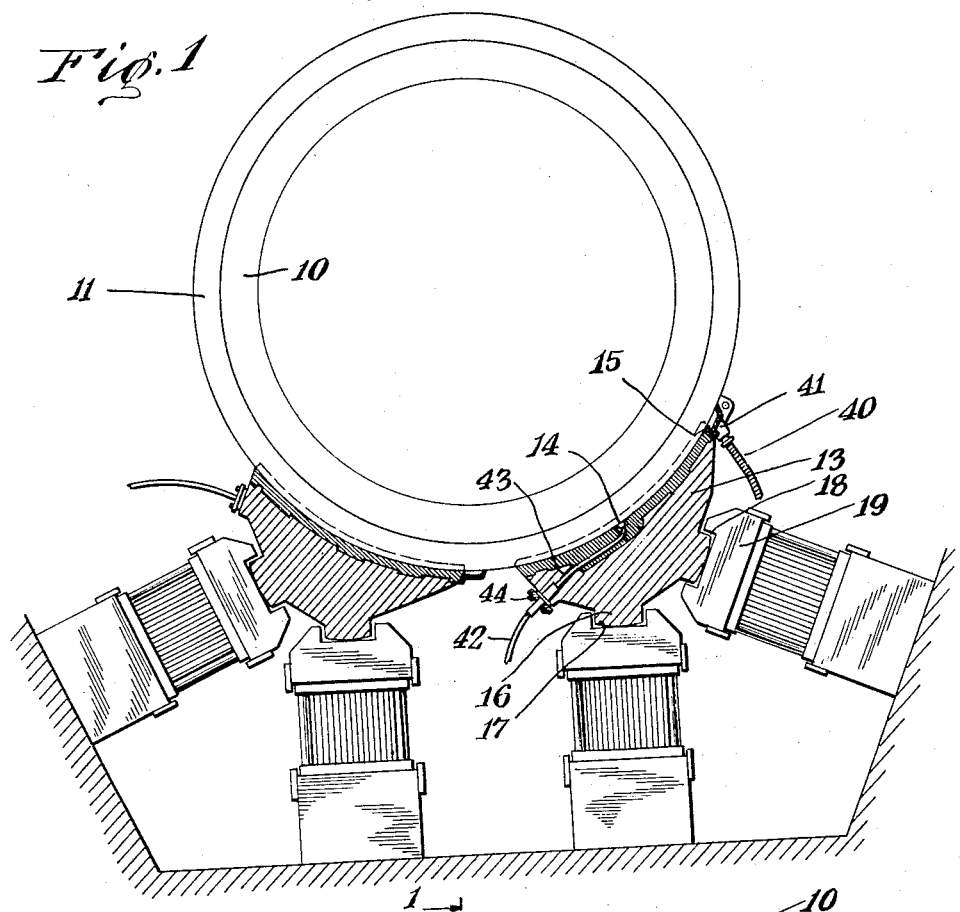
Inventor
Michael Treschow
By his Attorneys
Redding, Greeley, O'Shea & Campbell

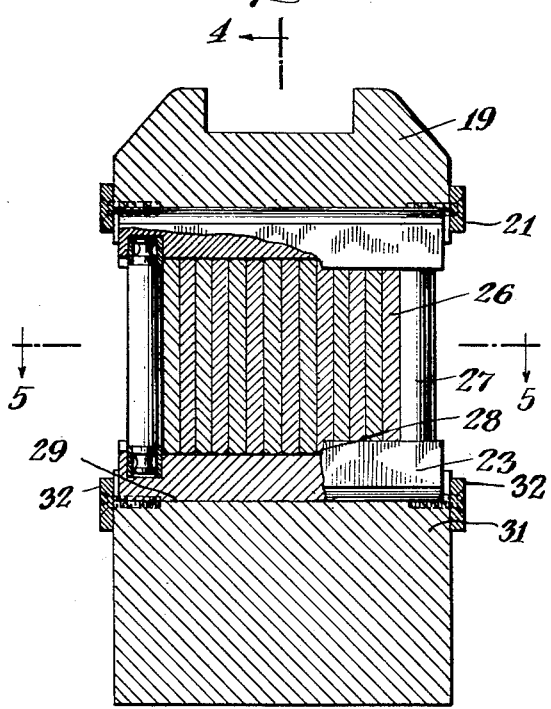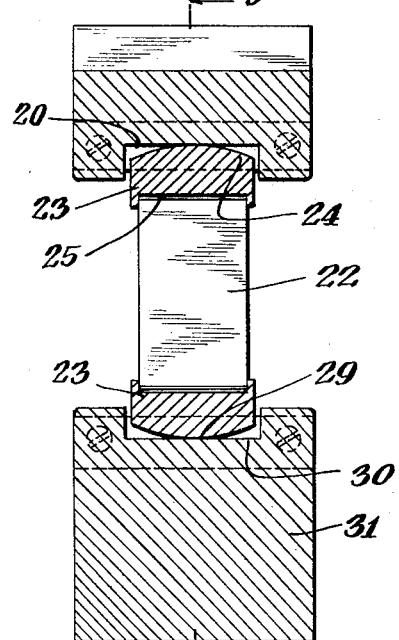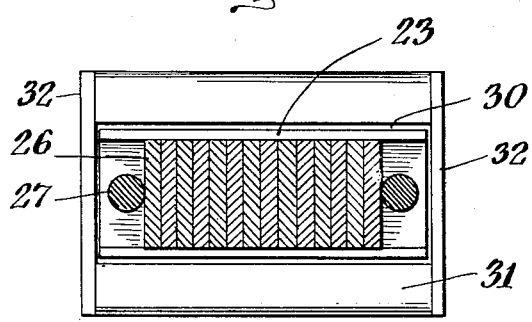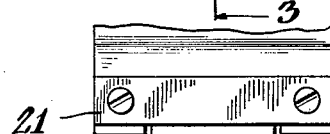

Patented July 25, 1933

1,919,489

UNITED STATES PATENT OFFICE

MICHAEL TRESCHOW, OF KEW GARDENS, NEW YORK, ASSIGNOR TO F. L. SMIDTH & CO., OF NEW YORK, N. Y., A CORPORATION OF NEW JERSEY

TUBE MILL BEARING DEVICE

Application filed May 2, 1931. Serial No. 534,537.

The present invention relates to tube mill bearing devices and embodies, more specifically, an improved bearing device for the slide shoe of tube mills whereby all stresses and strains impressed upon such bearing devices are transmitted to the base or supporting structure for the wheel without injuring the mounting mechanism.

In applicant's prior Patent No. 1,747,609, dated February 18, 1930, for Tube mill, a support is shown wherein each sliding shoe is mounted in such manner that the shoe aligns itself by movement about two axes at right angles, whereby effective load distribution over the entire sliding surface of the shoe is had. The present invention includes the features described in the foregoing patent and, additionally, accommodates free adjustability of the supporting mechanism about radial lines through the supporting shoes. For example, if the sliding ring is mounted on the mill in such manner that its plane is not exactly at right angles to the axis of the mill, there will exist a twisting force which exerts severe pressure on the corners of the shoes unless free adjustability is afforded on radial lines passing through the shoes.

Where a sliding shoe engages a track on a rotating body and is supported upon shoe mounting devices, the axes of which form equal angles with a radius of the body and intersect such radius at a point on the periphery of the body, a universal ball mounting effect is had when provision is made for movement of the shoe on the members to vary the point of contact therebetween in such manner that the above relationship between the axes may always be preserved regardless of the shifting of the axis of the body, or irregular movements thereof from true rotation about its axis.

An object of the invention, accordingly, is to provide a sliding shoe support which provides a freely adjustable supporting means in all directions, regardless of the inaccuracy in the construction or assembly of a mill and thus preserves a definite relationship between the axes of the supporting means and the radius of the mill at a point on the circumference thereof.

A further object of the invention is to provide a sliding shoe supporting device of the above character, wherein the shoe is not only mounted upon the base structure with provision for pivotal movement about axes at right angles to each other but with further provision for bodily movement in a direction parallel to the axis of the mill.

Further objects, not specifically enumerated above, will be apparent as the invention is described in greater detail in connection with the accompanying drawings, wherein:

Figure 1 is a view in section, taken on a plane passing through a mounting device constructed in accordance with the present invention, and showing the elements thereof, the view being taken on a plane indicated by the line 1—1 of Figure 2, and looking in the direction of the arrows.

Figure 2 is a view in side elevation, showing one of the shoe mounting devices removed, and the remaining shoe mounting device and shoe in the position shown in Figure 1.

Figure 3 is a view in section, taken on line 3—3 of Figure 4, and looking in the direction of the arrows, the shoe mounting mechanism being shown therein.

Figure 4 is a view in section, taken on line 4—4 of Figure 3, and looking in the direction of the arrows.

Figure 5 is a view in section, taken on line 5—5 of Figure 3, and looking in the direction of the arrows.

Figure 6 is an enlarged view, similar to Figure 2, showing the shoe mounting device of the present invention.

Referring to the above drawings, the shell of a mill or other device is shown at 10, carrying a bearing ring or tire 11 which is supported upon a plurality of sliding shoes 13. The shoes are provided with suitable bearing members which are chamfered at 15 to facilitate the lubrication of the ring and shoe.

Each sliding shoe 13 is provided with two rails 16 which are curved at 17 to engage recesses 18, formed in the shoe engaging members or floating blocks 19. The curvature of the surface 17 is preferably about the point of intersection of the axes of the floating blocks 19 as a center, thus forming a cylindrical surface.

The floating blocks 19 are further formed with grooves 20 and plates 21 are secured to the ends of the blocks to serve as stops to limit the endwise movement of the floating blocks with respect to the mechanism to be described presently.

Blocks 19 are mounted upon roller plates 22 which include top and bottom members 23 formed with curved surfaces 24 and grooves 25 to receive the ends of thin steel plates or laminations 26. Tie rods 27 are provided at each end of the roller plate and form a frame that enables the elements to be held together as a unit. The ends of the plates 26 are rounded, as at 28 and each plate forms a cylindrical portion upon which the weight of the mill and shoe is impressed. In this fashion, the top and bottom heads 23 are so articulated that relative movement therebetween may take place, the heads always lying in parallel planes.

The lower surface of the bottom head 23 is curved cylindrically at 29 and engages in a groove 30 in a base 31, carried by the base plate and mill foundation. The groove 30 is provided with plates 32, at the ends thereof, to limit the movement of the head 23 longitudinally.

From the foregoing description, it will be apparent that movement of the mill body along its axis due, for example, to expansion of the mill or to any other cause, produces a rolling action of the bearing member and heads 23 on the cylindrical surfaces 24 and 29, cooperating with the grooves 20 and 30, respectively. No relative movement between the heads 23 and the spring plates 26 takes place upon the foregoing movement of the mill body.

Lubrication of the bearing surface between the shoe and bearing ring is effected by means of a conduit 40 which introduces oil into a housing 41 carried by one end of the shoe. The chamfered leading edge of the shoe facilitates the introduction of the lubricant between the cooperating bearing surfaces, and an auxiliary conduit 42 provides a secondary source of lubricant which is introduced into a duct 43 carried by the shoe, the conduit 42 being secured thereto by means of a fitting 44. The lubricant is thus forced between the shoe and the bearing ring intermediate the ends of the shoe. Any suitable pumping mechanism may be provided to afford the desired pressure source for the lubricant.

The cylindrical surfaces 17 of the rails permit rocking movement of the shoes 13 about an axis passing through the centers of curvatures of such rails, and twisting movement of the shoe about an axis passing through the axis of the mill is accommodated by means of relative movement between the heads 23 upon the cylindrical surfaces 28 at the ends of the spring plates 26. In the event that such twisting movement takes place, the amount of movement within the bearing member and between the heads 23 of the respective members depends upon the direction of the twisting force with respect to the axes of the several supporting devices. Should the axes of the shoe mounting devices be at right angles to each other, and the twisting force applied upon an axis coincident with the axis of one of the devices, a pure rolling action of the other device upon the cylindrical surfaces 24 and 29 will occur whereas in the first device each spring plate 26 will get a small elastic twist along their axes.

It will thus be seen that the shoe support permits a free turning movement of the shoe in any direction about its center without producing binding or excess friction. Furthermore, the center of the shoe may follow longitudinal movements of the mill and sliding ring without producing any deleterious effects in the supporting device. A further distinctive advantage of the device shown and described herein lies in the relation of the shoe mounting devices with respect to the shoe. It will be seen that the center of the shoe through which force is applied from the mill lies adjacent the sliding surface of the shoe and thus the stability of the shoe and supporting mechanism is not impaired. The proper balance of the shoe is thus preserved, no disturbing torque can be produced, and a highly efficient bearing support results. The lubrication of the shoe is accomplished in an effective manner and the elements comprising the supporting mechanism, in addition to relieving the mill supporting elements from many severe strains during operation, are simple in construction and operation, being easily assembled and serviced.

The foregoing construction will be seen to include elements for mounting a sliding shoe in such fashion that the shoe may rock about axes at right angles to each other in a given plane and, at the same time, move about an axis perpendicular to the first axes, these axes converging at a point on the periphery of the mill, or track carried by the mill. By maintaining the intersection of the axes of the bearing blocks at the periphery of the track shoe or other bearing surface, and preserving the angles of such axes with respect to a radius of the mill passing through such intersecting point, or the angles of such axes with respect to the tangent to the surface at such point equal, a true universal mounting is provided which relieves the bearing of all deleterious stresses due to irregular movements of the mill. The complete universal nature of the support will thus be seen to be provided by means of the shoe mounting device construction including the spring plates which permit lateral displacement of the upper and lower portions of the block to relieve torsional strains set up by the shoe under certain conditions.

While the invention has been described with specific reference to the accompanying drawings, it is not to be limited, save as defined in the appended claims.

I claim as my invention:

1. A bearing shoe support comprising a bearing shoe having a hollow cylindrical bearing surface, a base, a plurality of independent bearing devices for the shoe adapted to transmit forces independently between the shoe and base, the axes of the devices intersecting on the cylindrical surface and forming equal angles with a tangent to the cylindrical surface at the point of intersection, and means to permit relative rolling movement between the devices and associated elements.

2. A bearing shoe support comprising a bearing shoe having a hollow cylindrical bearing surface, a base, a plurality of independent bearing devices for the shoe adapted to transmit forces independently between the shoe and base, the axes of the devices intersecting on the cylindrical surface and forming equal angles with a tangent to the cylindrical surface at the point of intersection, means to permit relative rolling movement between the devices and associated elements, and means to permit the devices to yield to preserve a predetermined relationship between the axes thereof and the cylindrical bearing surface.

3. A bearing shoe support comprising a bearing shoe having a hollow cylindrical bearing surface, a base, a plurality of bearing devices between the shoe and base, the axes of the devices intersecting on the cylindrical surface and forming equal angles with a tangent to the cylindrical surface at the point of intersection, means to permit relative rolling movement between the devices and associated shoe, said devices being formed of top and bottom plates, tie rods connecting the plates and laminations spacing the plates and formed with curved end bearing surfaces.

4. A bearing shoe support comprising a bearing shoe, a base, a bearing device between the base and shoe, cooperating plane and curved bearing surfaces between the shoe and device, cooperating plane and curved bearing surfaces between the base and device contacting along a surface the axis of which is at right angles to the axis of the first named cooperating surfaces, and means to permit movement of the axes in parallel planes.

5. A bearing shoe support comprising a bearing shoe, a base, a shoe engaging member, cooperating plane and curved bearing surfaces between the shoe and member, a bearing device mounted between the member and base, cooperating plane and curved bearing surfaces between the ends of the device and the member and base respectively, the axis of the surface of contact between the last named surfaces being perpendicular to the axis of contact between the first surfaces, and means to permit movement of the shoe engaging member parallel to the base.

6. A bearing shoe support comprising a bearing shoe, a base, a floating shoe engaging member, cooperating plane and curved bearing surfaces between the shoe and member, a bearing device mounting the member on the base, cooperating plane and curved bearing surfaces between the ends of the device and the member and base, respectively, the axis of the surface of contact between the last named surfaces being perpendicular to the axis of contact between the first surfaces, said bearing device including top and bottom plates, tie rods connecting the plates, and a plurality of plates having curved ends to engage the plates.

7. A bearing shoe support comprising a bearing shoe, a base, a floating shoe engaging member, cooperating plane and curved bearing surfaces between the shoe and member, a bearing device mounting the member on the base, cooperating plane and curved bearing surfaces between the ends of the device and the member and base respectively, the axis of the surface of contact between the last named surfaces being perpendicular to the axis of the surface of contact between the first surfaces, said bearing device including top and bottom plates, tie rods connecting the plates, and laminations spacing the plates, said laminations having curved end bearing surfaces.

MICHAEL TRESCHOW.